United States Patent [19]
Jones et al.

[11] Patent Number: 5,655,077
[45] Date of Patent: Aug. 5, 1997

[54] METHOD AND SYSTEM FOR AUTHENTICATING ACCESS TO HETEROGENEOUS COMPUTING SERVICES

[75] Inventors: Gregory A. Jones; Robert M. Price, both of Seattle; William L. Veghte, Bellevue, all of Wash.

[73] Assignee: Microsoft Corporation, Redmond, Wash.

[21] Appl. No.: 356,071

[22] Filed: Dec. 13, 1994

[51] Int. Cl.$^6$ .................................................. G06F 11/00
[52] U.S. Cl. ............................. 395/187.01; 395/188.01
[58] Field of Search ........................... 395/187.01, 186, 395/188.01, 481, 490, 491, 200.06, 200.09, 200.12, 200.2, 285; 380/3, 4, 23

[56] References Cited

U.S. PATENT DOCUMENTS

| | | | |
|---|---|---|---|
| 4,484,306 | 11/1984 | Kulczyckyj et al. | 395/188.01 |
| 4,698,757 | 10/1987 | Dill et al. | 395/187.01 |
| 4,799,153 | 1/1989 | Hann et al. | 395/187.01 |
| 4,930,159 | 5/1990 | Kravitz et al. | 380/23 |
| 5,204,961 | 4/1993 | Barlow | 395/187.01 |
| 5,241,594 | 8/1993 | Kung | 380/4 |
| 5,263,165 | 11/1993 | Janis | 395/725 |
| 5,287,461 | 2/1994 | Moore | 395/275 |
| 5,335,346 | 8/1994 | Fabbio | 395/600 |
| 5,359,721 | 10/1994 | Kempf et al. | 395/187.01 |
| 5,408,653 | 4/1995 | Josten et al. | 395/600 |
| 5,414,839 | 5/1995 | Joshi | 395/600 |
| 5,426,427 | 6/1995 | Chinnock et al. | 395/200 |
| 5,455,953 | 10/1995 | Russell | 395/187.01 |
| 5,499,342 | 3/1996 | Kuraihara et al. | 395/200.12 |

OTHER PUBLICATIONS

Hauser et al., "Reducing the Proliferation of Passwords in Distributed Systems", IFIP Transactiona A, vol., A-13, pp. 525-531 Sep. 1992.

*Primary Examiner*—Robert W. Beausoliel, Jr.
*Assistant Examiner*—Joseph S. Palys
*Attorney, Agent, or Firm*—Seed and Berry LLP

[57] ABSTRACT

A method and system for authenticating access to heterogeneous computing services is provided. In a preferred embodiment, logon providers are configured into the computer system, which provide secure access to their services by requiring authentication of user identification information using a logon mechanism. According to this embodiment, a user designates a primary logon provider to provide an initial logon user interface. The user enters identification information when this user interface is displayed, for example a user name, a password and a domain. The computer system executes a logon sequence, which first invokes the primary logon provider to collect identification information and to authenticate the user for access to services provided by the primary logon provider. The system then authenticates the collected identification information to provide the user access to operating system computer services. If the system logon authentication procedure is not successful, then the logon sequence displays its own user interface to collect additional identification information. The logon sequence then invokes the logon routines of other logon providers to enable them to authenticate already collected identification information without displaying additional user interfaces. A preferred embodiment enables the system logon sequence to use authentication information stored on a network to authenticate the user for access to local computing services. Also, logon providers can be provided for drivers other than network drivers when a logon mechanism is required to access their computing services. Further, using a primary logon provider, the initial logon user interface displayed to collect identification information can be replaced.

50 Claims, 8 Drawing Sheets

METHOD AND SYSTEM FOR AUTHENTICATING ACCESS TO HETEROGENEOUS COMPUTING SERVICES

TECHNICAL FIELD

The present invention relates generally to a computer system for authenticating access to computing services and, more specifically, to a method and system for authenticating access to multiple heterogeneous resources while minimizing the number of user interactions.

BACKGROUND OF THE INVENTION

In a networked computing environment, it is typical for multiple computer systems to be connected together through a physical communications link, which comprises the network. Typically, each computer system (node) that desires to use the services of another computer system (node) acts as a client node. A client node contains hardware for connecting to the network and a collection of software components for communicating with the hardware to access network services and for providing higher level network services. This collection of software components is collectively referred to as a network driver for convenience, even though the collection actually may comprise several drivers and other modules such as protocols and redirectors. Some network drivers provide a degree of security before they allow a program or user to access the services provided by the network. It is typical in these more secure environments for network drivers to require a user to "logon" to the network for the network driver to allow access to the network services it provides. The logon mechanism typically involves displaying some kind of user interface (e.g., a dialog window) and requires the user to enter identification information such as a user name and a password. The network driver then performs an authentication procedure for validating the entered identification information against known information to verify that the user is permitted to access the network services. The validation process may involve directly comparing the information or comparing by-products of the information using well-known encryption and decryption techniques. For example, the network driver may store passwords for each user that is allowed to access the network. During the authentication procedure, the network driver compares the entered password for that user name with the previously stored password information by using the entered password to encrypt a randomly agreed number. When a match occurs, the network driver permits access to the network services. Typically, a separate logon mechanism is required by each network driver and by the computer system (the local node) to gain access to the local computing services when a secure local environment is maintained.

SUMMARY OF THE INVENTION

The limitations of prior systems are overcome by the present invention, which is an improved method and system for authenticating access to heterogeneous computing services. In a preferred embodiment, a driver is designated as the primary logon provider, which provides an initial user interface for a sequence of logon interactions. When the computer system is powered up, and at other times when logon is desired, the primary logon provider is invoked and attempts to collect and authenticate identification information for access to the computing services it provides. When the driver serving as the primary logon provider successfully authenticates the collected identification information, the computer system attempts to authenticate the same identification information for access to system computing services without displaying additional user interfaces.

In one embodiment, the primary logon provider is a network driver, which provides access to network services. Once identification information has been collected and authenticated by this network driver, the local computer system has access to the network services provided by the network driver designated as the primary logon provider. The local computer system can then use the same identification information to authenticate access to local computing services.

In another embodiment, multiple logon providers are present in the computer system, each of which has its own authentication mechanism. In this embodiment, each logon provider other than the primary logon provider attempts to authenticate the identification information collected by the primary logon provider without displaying additional user interfaces for collecting additional identification data.

In yet another embodiment, the primary logon provider determines whether it is actively connected to the physical device or pseudo-device for which it provides services. When the primary logon provider determines that it is not actively connected, the primary logon provider avoids user interaction by not displaying its logon user interface. The authentication code of the computer operating system then displays its own user interface to collect identification information for authenticating access to system services.

In yet another embodiment, multiple logon providers are present in the computer system, each of which determines whether it is actively connected to the physical device or pseudo-device for which it provides services. When it determines that it is not actively connected, the provider avoids user interaction by not displaying its logon user interface.

In yet another embodiment, each logon provider is a network driver that is connected to a different (heterogeneous) network. Each network driver attempts to utilize the identification information collected by the primary logon provider to authenticate access to its own network without displaying another user interface.

In yet another embodiment, a user can control the logon user interface presented by a computer system by designating which logon provider is to serve as the primary logon provider.

In yet another embodiment, system authentication information is stored on a different network node other than the local computer system. The primary logon provider provides access to this system authentication information. Once a user has completed the logon mechanism to gain access to the network services provided by the primary logon provider, the local computer system has access to the system authentication information stored on the different network node. The local computer system logon mechanism uses this system authentication information to authenticate the collected identification information for access to local system services.

DETAILED DESCRIPTION OF THE INVENTION

Figure 1:
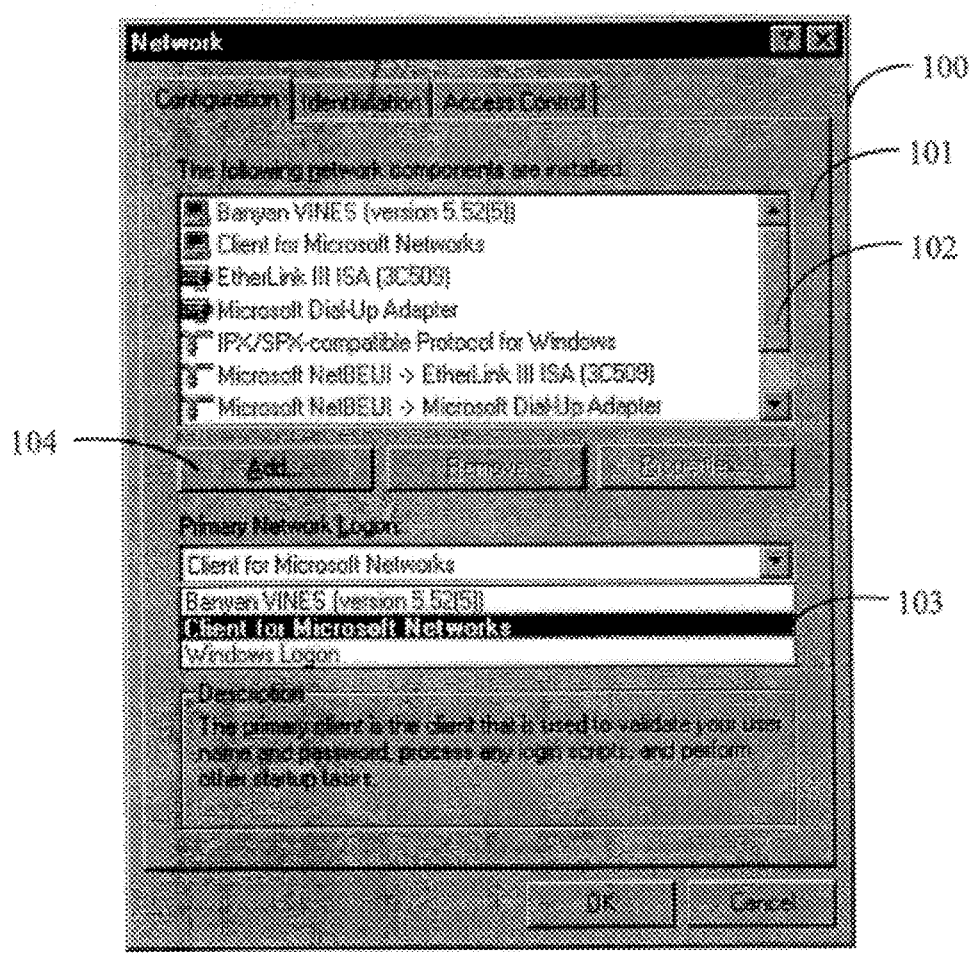
FIG. 1 is an example network configuration dialog for designating a primary logon driver.

Embodiments of the present invention provide methods and systems for authenticating access to heterogeneous computing services using a single user interface. According to the present invention, a user designates a driver to serve as a primary logon provider by means of a configuration dialog. For the purposes of this invention, a driver is any software code that provides a published or known set of routines for accessing a set of services. For example, a device driver that provides access to a disk drive (a device) is a driver, as is database code that provides access to a database (a pseudo-device). When the computer system is powered on, or at other system initialization times, the computer system invokes a logon mechanism to enable the user to gain access to different computing services, each of which require authentication of identification information to validate the user for authorized access to the services provided. Each driver that supports a logon mechanism and requires authentication for access to its services is referred to as a logon provider. According to the present invention, the logon mechanism invokes the designated primary logon provider to display a user interface for collecting identification information such as a user name, a password and an entity to validate against such as a domain name. Once the user enters the user's identification information, the primary logon provider authenticates this information using its own authentication procedure. Subsequently, the logon mechanism attempts to authenticate the already entered identification information for access to other computer system services without displaying additional user interfaces. Next, for each additional logon provider configured into the system, the computer system invokes that driver passing the identification information already collected. Each additional logon provider is then responsible for authenticating this same information for access to its services and attempts to do so without displaying an additional user interface. In this manner, the number of times a user is prompted to enter logon identification information is minimized.

Although the present invention is discussed below specifically with reference to network drivers, one skilled in the art will appreciate that the present invention is useful in other contexts as well, such as for other drivers that require logon authentication for access to their services. One example of such a driver is a database driver that provides secure access to its databases. Another example is an electronic mail server that provides secure access to a mail system (whether or not the computer is connected to a network). The mail system and databases are considered, "pseudo-devices" because they are being treated like physical devices, with access to them controlled by their drivers.

Embodiments of the present invention also provide a mechanism for displaying the user interface of the primary logon provider only when the driver is actively or successfully connected to the device (or pseudo-device) it services. The notion of an active or successful connection is driver defined. For example, in a networking environment where a portable computer may or may not be currently physically connected to a network, a logon user interface would only be displayed when the computer system is physically connected to the network. This mechanism prevents a user from being confronted with multiple user interfaces simply because the computer system is not currently connected to a device or because the connection has failed for some other reason. Otherwise, the user would be needlessly confronted with a user interface even when no access to the device is possible or when the access would fail or not make sense.

FIG. 1 is an example configuration dialog for designating a primary logon provider in a network environment. The network configuration dialog 100 contains a property sheet 101 for configuring various network components. The list box 102 shows the network components that are currently installed in the computer system. The add button 104 allows a user to add four types of network components, including the following components: client drivers (network software drivers) that enable the computer to connect to other computers via the network services supplied by the client driver (e.g., Banyan VINES, Netware, and Client for Microsoft Networks); adapters, which are software modules that correspond to various hardware devices that physically connect the computer to the network (e.g., IBM TokenRing, Microsoft DialupAdapter, or Racal ES3210 EISA); protocols, which are language modules the computer uses to communicate over the network (e.g., the Banyan VINES protocol, Microsoft NetBEUI, or Microsoft TCP/IP); and services, which are software modules that enable other computers on a network to share folders, printers, and other resources residing on this computer. Once the user has installed the desired network components, a list of configured network client drivers is provided in Primary Network Logon list box 103. The user selects a primary network provider by selecting one of the client drivers from this list box. As shown, the list box 103 contains two different client drivers: the Banyan VINES driver and the Client for Microsoft Networks driver. In addition, the list box 103 contains an entry for the Windows Logon code. The Windows Logon code refers to the authentication code provided by the Windows operating system for validating access to local computing services (e.g., access to the local "desktop"). The Windows Logon code entry allows a user to select the authentication code provided by the Windows operating system as the primary logon provider instead of a network driver. The driver selected as the primary network provider is the driver responsible for displaying an initial user interface to collect the user identification information, such as a user name, a password and a domain name. When the Windows Logon entry is selected from the list box 103 as the primary logon provider, the Windows operating system will supply its own user interface as the initial logon user interface.

Figure 2:
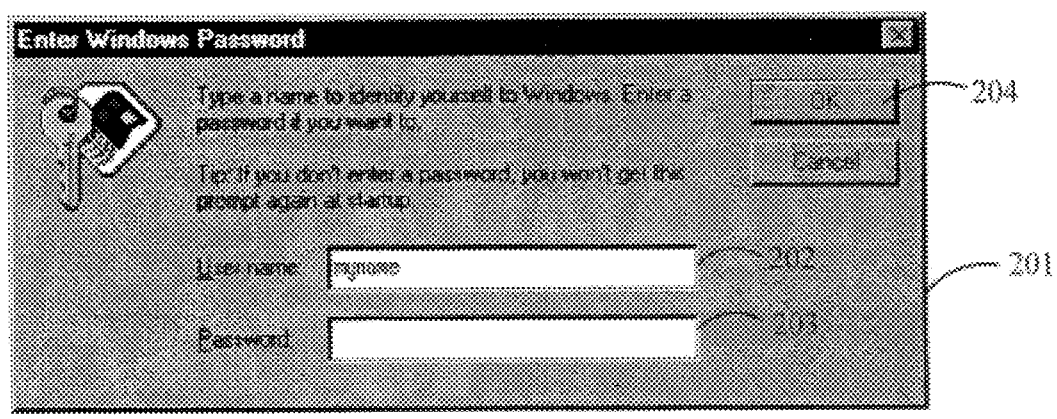
FIG. 2 is an example screen display of the Windows operating system logon user interface.

FIG. 2 is an example screen display of the Windows operating system logon user interface. The dialog box shown in FIG. 2 is displayed when the user powers up the computer system, or at other times when logon is appropriate, and has previously selected the Windows Logon entry from the list box 103 (shown in FIG. 1) as the primary logon provider. Dialog box 201 contains two fields for entering identification information to the computer system. A user name field 202 is provided to enable a user to enter a user identification sequence, e.g., a set of letters, numbers and other characters. A password field 203 is provided to enable the user whose user name is displayed in the user name field 202 to enter an access code. This access code ensures secure access to the computer system. That is, unless the user enters the "correct" password in the password field 203, the user is denied access to certain capabilities within the Windows operating system.

Once the user enters identification information and presses the OK button 204, the Windows operating system authenticates the collected information. This authentication procedure involves checking whether the password entered in the password field 203 is a valid password for the user name entered in the user name field 202. If the password is valid for the specified user name, then the authentication is successful. One skilled in the art will recognize that there are many ways to store information regarding which passwords are valid for which user names. For example, a simple text file stored under an unpublicized name can be used. Alternatively, a secure file itself protected by a password can be used. Other implementations are possible.

Figure 3:
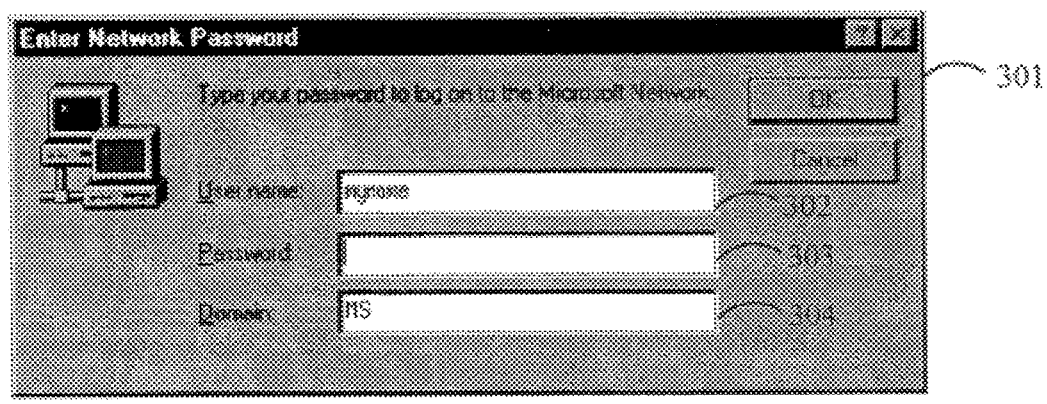
FIG. 3 is an example screen display of a logon dialog of a network client driver serving as the primary logon provider.

If, instead of selecting the Windows Logon code as the primary logon provider, the user had selected a network client driver from the list box 103 in FIG. 1, then the logon user interface for that particular network driver is displayed when the user powers up the computer system or at subsequent times when logon is desired. FIG. 3 is an example screen display of a logon dialog of a network client driver serving as the primary logon provider. Dialog box 301 is a driver-specific dialog provided by the Client for Microsoft Networks client driver. This driver is displayed as the currently selected primary logon provider in list box 103 of FIG. 1. One skilled in the art will recognize that other methods for providing a logon user interface are possible, as well as other user interfaces other than dialog boxes. For example, a resource file or an API could be provided by the underlying operating system and made available to the various client network drivers to be used for building their logon user interfaces. In FIG. 3, dialog window 301 contains three identification information fields. User name field 302 is an edit field for entering the user's identity. Password field 303 is an edit field for entering a password corresponding to the user name displayed in field 302. Domain field 304 is an edit field which determines the authenticating authority that is to validate the password entered in field 303. The entries in the user name and password fields are authenticated to provide secure access to the network services provided by the particular network client driver that is currently displaying the dialog (in this case, the client for Microsoft Networks driver services).

In prior systems, if a computer system was connected to several different networks via different network client drivers, then the user would be confronted with a separate logon user interface for each network to which the user attempted access. Embodiments of the present invention provide a mechanism for enabling a user to choose which logon user interface is initially displayed and for minimizing the number of user interface interactions required when a computer system is connected to multiple heterogeneous networks (different types of networks, such as Banyan VINES or Netware). Heterogeneous networks typically use different protocols to communicate between the computer systems connected by the network and typically provide their own logon and authentication mechanisms. Thus, without a mechanism to control the flow of user interface interactions, the user would typically be confronted with many different and potentially confusing user interfaces.

Also, embodiments of the present invention minimize the number of user interface interactions when the computer system is not actively or successfully connected to devices or pseudo-devices, but is configured to support them. For example, if the user has selected from list box 103 in FIG. 1 a network client driver as the primary logon provider, but the computer system is not currently connected to the corresponding network or the connection has somehow failed, embodiments of the present invention will display the user interface corresponding to the Windows Logon code (a dialog similar to that shown in FIG. 2) or that of another logon provider instead of displaying the user interface of the designated primary logon provider.

In preferred embodiments, the methods and systems of the present invention are implemented on a computer system comprising a central processing unit, a display, a memory, and input/output devices. Preferred embodiments are designed to operate in an operating system environment such as the Microsoft Windows environment defined by Microsoft Corporation in Redmond, Wash. One skilled in the art will also recognize that embodiments of the present invention can be practiced in other operating system environments.

Figure 4:
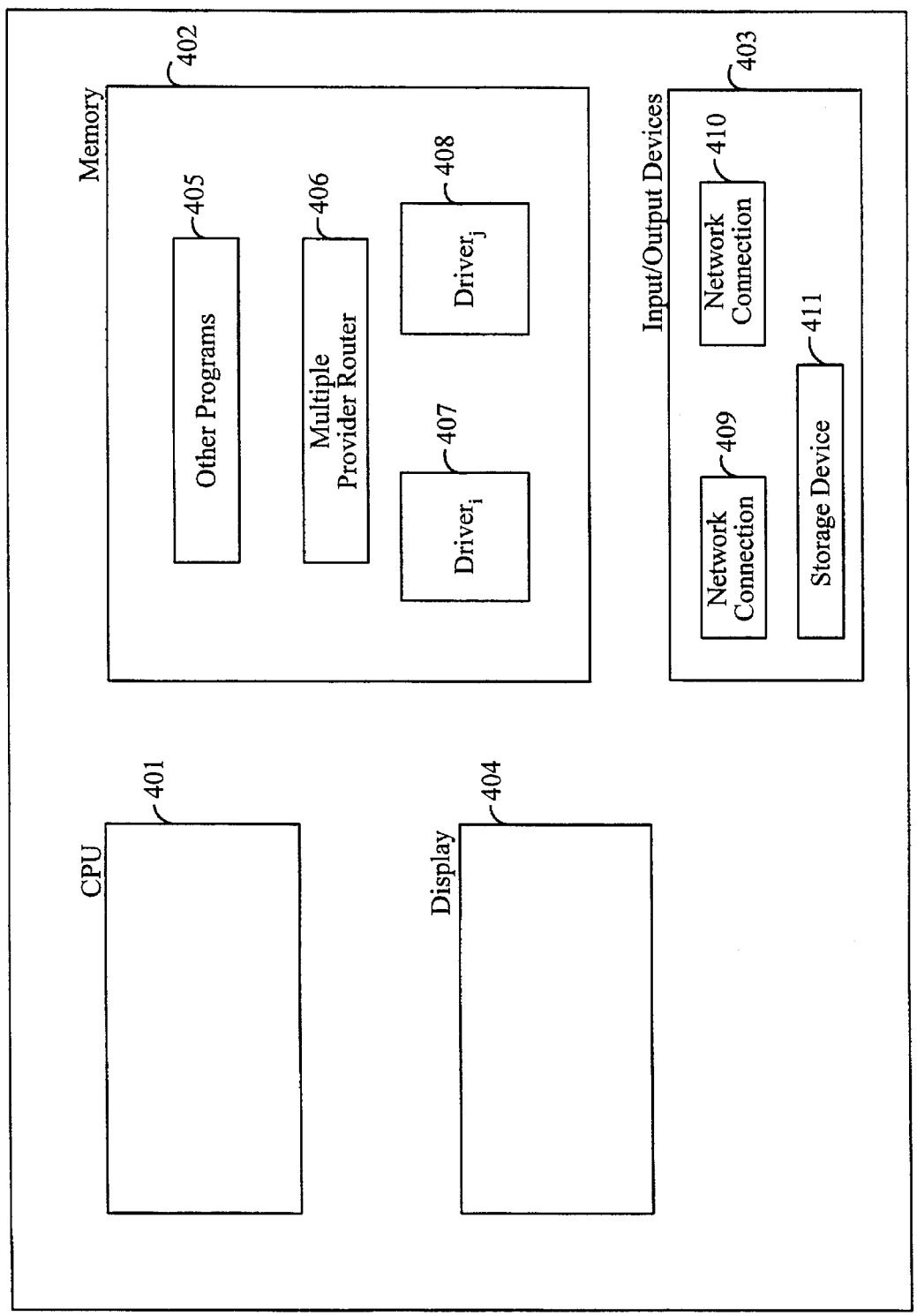
FIG. 4 is a block diagram of a general purpose computer for practicing preferred embodiments of the present invention.

FIG. 4 is a block diagram of a general purpose computer for practicing preferred embodiments of the present invention. The computer system 400 contains a central processing unit (CPU) 401, a display screen (display) 404, input/output devices 403, and a computer memory (memory) 402. The network drivers, as well as the operating system code for producing the logon user interface shown in FIG. 2, preferably reside in the memory 402 and execute on at least one CPU such as the CPU 401. The operating system code for controlling the initialization of the various network connections when the computer system is powered on is shown as the Multiple Provider Router 406 ("MPR") executing in the memory 402. Two network drivers are shown as driver$_i$ 407 and driver$_j$ 408. These network drivers are invoked by the MPR 406 to authenticate access to the network services provided by the drivers. The input/output devices 403 is shown containing two network connections 409 and 410 and storage device 411.

The two network connections 409 and 410 are present to illustrate that preferred embodiments are operative in an environment where the computer system is connected to one or more networks and that these networks may be heterogeneous. One skilled in the art will appreciate that the methods of the present invention may be practiced on processing systems with varying architectures, including multi-processor environments, and on systems with hard wired logic. Also, one skilled in the art will realize that the present invention can be implemented in a stand-alone environment where other types of drivers are used to support secure access to the computing services provided.

Figure 5:
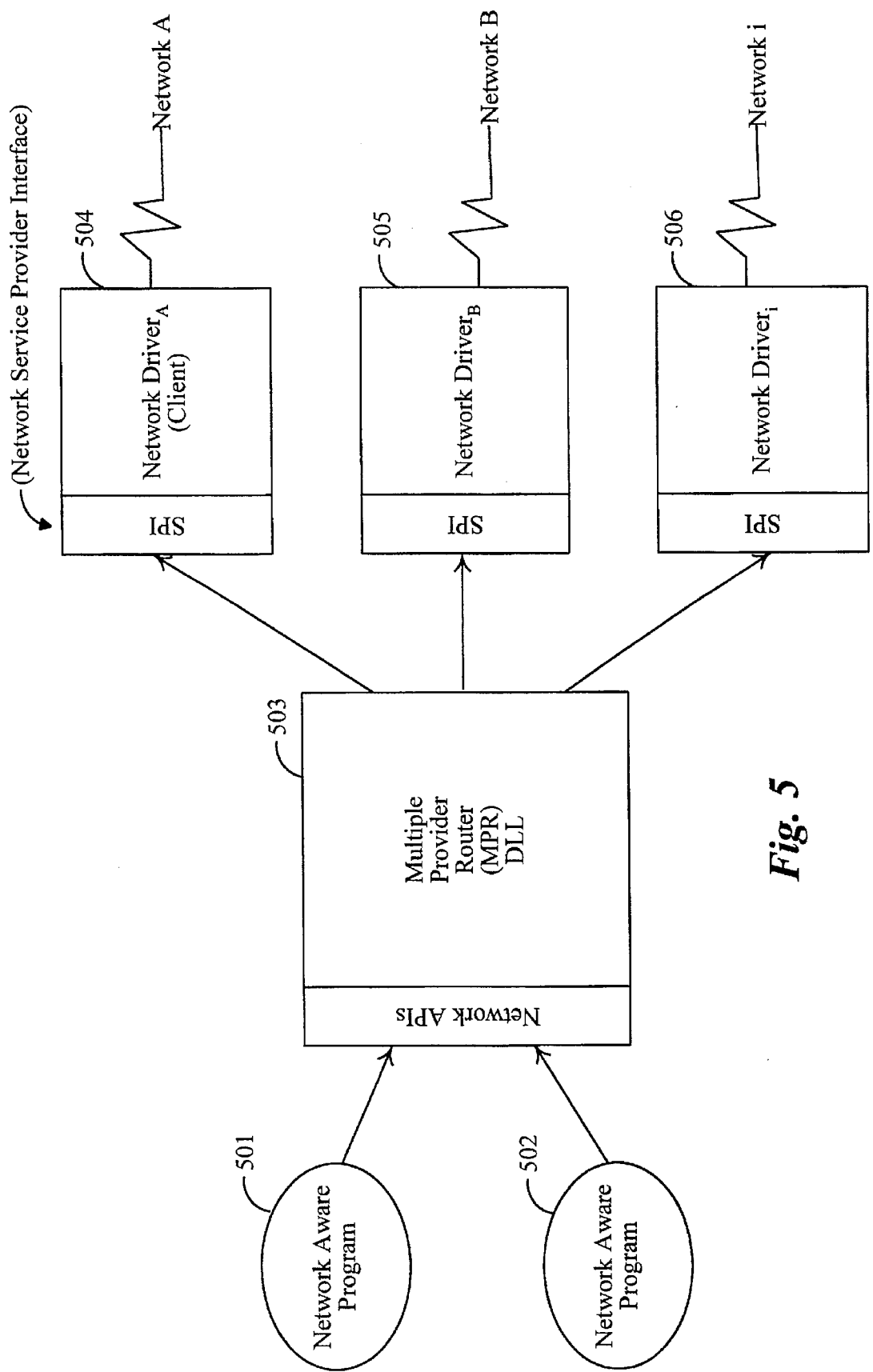
FIG. 5 is a block diagram of the software architecture of the present invention implemented in a network environment.

In one aspect of the invention, a preferred embodiment provides several application programming interfaces ("APIs", or sets of routines) for carrying out the methods of the present invention. FIG. 5 is a block diagram of the software architecture of the present invention implemented in a network environment. FIG. 5 shows two programs 501 and 502 (e.g., application programs), a multiple provider router dynamic link library ("DLL") 503, and three network drivers 504, 505, and 506 as might reside in the memory 402 of the computer system 400 shown in FIG. 4. The multiple provider router DLL 503 stores the code for the multiple provider router ("MPR"), which is implemented by the local computer operating system. The MPR code implements a set of network APIs, which are network independent and can be used by programs 501 and 502 to communicate with the various network drivers presently configured on the computer system. These network APIs enable programs 501 and 502 to communicate over the various connected networks without requiring specific knowledge regarding the capabilities or the programming interfaces of the networks. The MPR code 503 routes a program's request received through the network APIs to the various configured network drivers by calling routines defined in a Network Service Provider Interface ("SPI"). (Recall that "network drivers" refers generically to the set of software components that provide access to the network and other network services.) The SPI is a programming interface defined by the operating system and implemented by the various network drivers that desire to be invoked by the MPR code 503. The operating system defines the SPI to enable the MPR code 503 to communicate with various types of network drivers without having to understand the particular nuances of each individual network driver. Thus, Network Driver$_A$, Network Driver$_B$, and Network Driver$_i$ 504, 505, and 506 all provide an implementation of the SPI routines that can be called by the MPR code 503 to communicate over Network A, Network B, and Network i.

Figure 6:
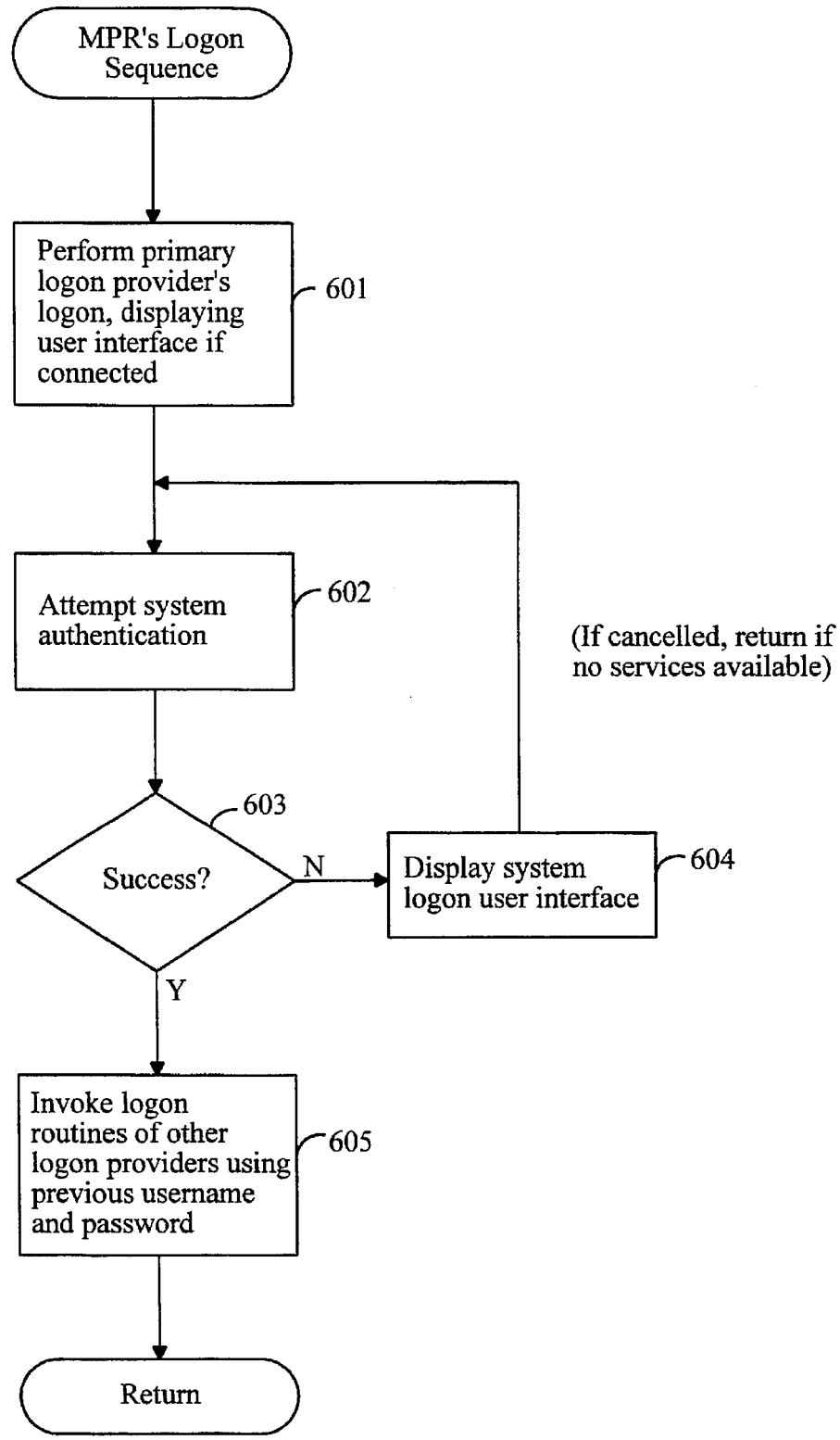
FIG. 6 is an overview flow diagram of the steps performed by the Multiple Provider Router code to authenticate identification information for access to the local computer system and to the current configured networks.

One of the routines defined as part of the Network Service Provider Interface is a logon routine. This routine is invoked by the MPR code 503, in an order to be described, to authenticate identification information for access to the networks currently configured in the computer system. FIG. 6 is an overview flow diagram of the steps performed by the Multiple Provider Router code to authenticate identification information for access to the local computer system and to the current configured networks. The logon sequence shown in FIG. 6 uses a designated primary logon provider to collect identification information, authenticates this identification information for access to local computing services without displaying an additional interface and then invokes the logon routines provided by the SPI implementations of the other network drivers currently configured in the computer system. Specifically, in step 601, the MPR code invokes the logon routine of the designated primary logon provider (driver). As will be discussed with reference to FIG. 8, the primary logon provider, if it is actively and successfully connected to a network device, displays its logon user interface to collect identification information and then authenticates that information. In step 602, the MPR code attempts local system authentication of the identification information collected at step 601 to validate the user for access to computing resources protected by the operating system. In step 603, the MPR code determines whether local system authentication was successful and, if so, continues at step 605, else continues in step 604. In step 604, the MPR code determines that it must display its own logon user interface to collect additional identification information and returns to step 602 to reattempt local system authentication. Otherwise, in step 605, the MPR code invokes the logon routines of the other network drivers currently configured using the previously collected identification information, and returns. The logon routines of the other network drivers may be invoked serially, concurrently, or in any order. One skilled in the art will recognize that the previously collected information provided to the logon routines of the other network drivers can be either the identification information collected by the primary logon provider in step 601 or the identification information collected for the purposes of local system authentication in step 604. Alternatively, default identification information could be provided instead of or in addition to the previously collected identification information.

Figure 7:
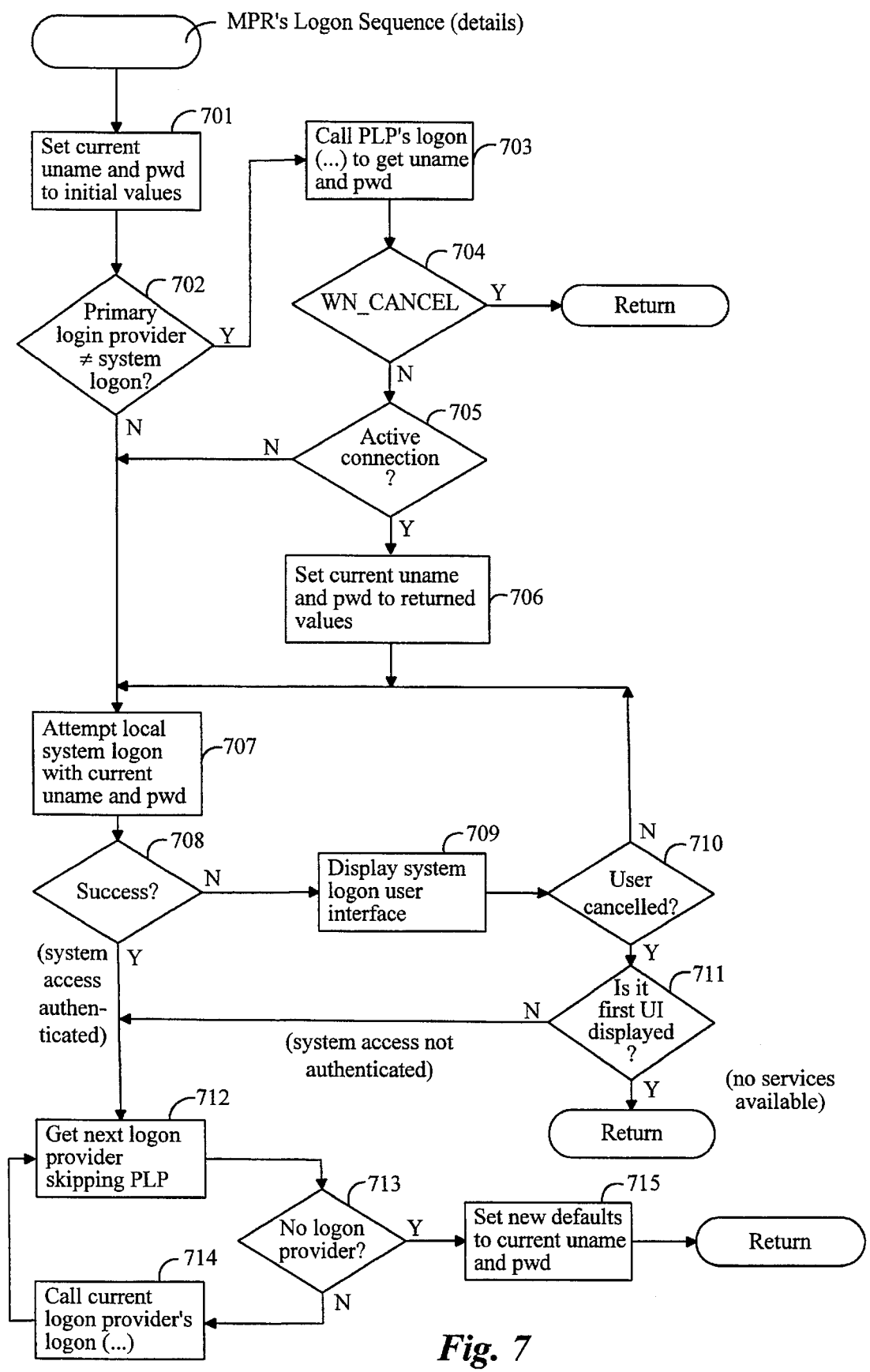
FIG. 7 is a detailed flow diagram of the logon sequence provided by a preferred embodiment of the MPR code.

FIG. 7 is a detailed flow diagram of the logon sequence provided by a preferred embodiment of the MPR code. In steps 701–706, the MPR code invokes the primary logon provider's logon code to collect identification information and to authenticate it for access to the services provided by the primary logon provider. These steps correspond to step 601 of FIG. 6. Steps 707–711 perform local system logon procedure and correspond to steps 602–604 of FIG. 6. Steps 712–715 invoke the other configured logon providers to authenticate access to their services. These steps correspond to step 605 of FIG. 6.

Specifically, in step 701 the MPR code determines initial values for the identification information. These may be default values or values previously saved from the last time this logon sequence was executed. In step 702, the MPR code determines whether a primary logon provider has been designated other than the system logon code (shown as the "Windows Logon" code entry in FIG. 1). If such a primary logon provider exists, then the MPR code continues in step 703, else continues in step 707. In step 703, the MPR code calls the primary logon provider's logon routine to collect identification information, which is typically a user name, a password and a domain. The initial identification information is passed to the primary logon provider so that the primary logon provider can use the information as needed, for example, to prefill the fields of the logon dialog box shown in FIG. 3. A preferred embodiment of the logon routine defined in the SPI is discussed in detail with reference to FIG. 8. In step 704, the MPR code determines whether the invoked logon routine returned a cancellation status and, if so, returns, otherwise continues in step 705. (The invoked logon routine would return a cancellation status if, for example, the user pressed the cancel button in dialog box 301 in FIG. 3.) In step 705, the MPR code determines whether the invoked logon routine has returned a status that indicates that the primary logon provider is actively (and successfully) connected to a device (or pseudo-device) and, if so, continues in step 706, else continues in step 707. In step 706, the MPR code sets the current identification information to the values returned by the primary logon provider's logon routine. Otherwise, when the logon user interface of the primary logon provider was not displayed because the primary logon provider was not connected successfully to its corresponding device or when the primary logon provider is the system logon code, the current identification values used are the initial identification information set in step 701.

Steps 707–711 perform local system logon using the system logon code. In step 707, the MPR code attempts to "logon" to the local system (local system authentication) using either the initial identification information set in step 701 or the identification information collected by the primary logon provider in step 703 (or the information collected by the system logon code in step 709, as is discussed below). The local system logon mechanism involves authenticating the passed identification information for access to whatever computing services the operating system is protecting. For example, the local computer system may maintain a user profile file that is protected by a password and cannot be accessed by application programs until it is "unlocked" by the local system logon code. In step 708, the MPR code determines whether the local system authentication was successful and, if so, continues in step 712, else continues in step 709. In step 709, since the authentication using the previously collected identification information was not successful, the MPR code displays its own logon user interface to collect additional identification information. In step 710, the MPR code determines whether the user canceled out of this user interface and, if so, continues in step 711, else returns to step 707 to reattempt local system authentication with the newly collected identification information. Local system authentication is thus reattempted until either the user cancels out of the user interface or authentication is successful. In step 711, if the user has canceled out of the system logon user interface and if this is the first logon user interface displayed to the user, then the MPR code returns because no services are available. (If the system logon user interface is the first logon user interface displayed, then either a primary logon provider other than the system logon code was not designated or the primary logon provider is not actively or successfully connected.) Otherwise, even though the identification information has not been authenticated for local system computing service access, other services (such as network services) are potentially available, and thus the MPR code continues in step 712.

In steps 712–714, the MPR code loops through a list of logon providers invoking their logon routines to enable them to perform their authentication procedures. Specifically, in step 712, the MPR code gets the next logon provider from the list of configured logon providers (e.g., list box 103 in FIG. 1) skipping over the designated primary logon provider. In step 713, the MPR code determines whether there is another logon provider on the list to process and, if so, continues in step 714, otherwise continues in step 715. In step 714, the MPR code calls the logon routine of the currently selected logon provider from the list. One skilled in the art will realize that, although the loop of steps 712–714 is shown to invoke the other logon providers serially in a sequence, other implementations are possible and might provide efficiency benefits on other architectures. For example, the additional logon providers' logon routines may be invoked concurrently. Alternatively, there may be a static or dynamic ordering of the providers or a mixture of serial and concurrent invocation. For example, the providers may each have an associated priority and the list of providers ordered and invoked according to these priorities. In step 715, the MPR code sets the default identification information to the current identification information to be used the next time the MPR logon sequence is invoked, and returns.

Figure 8:
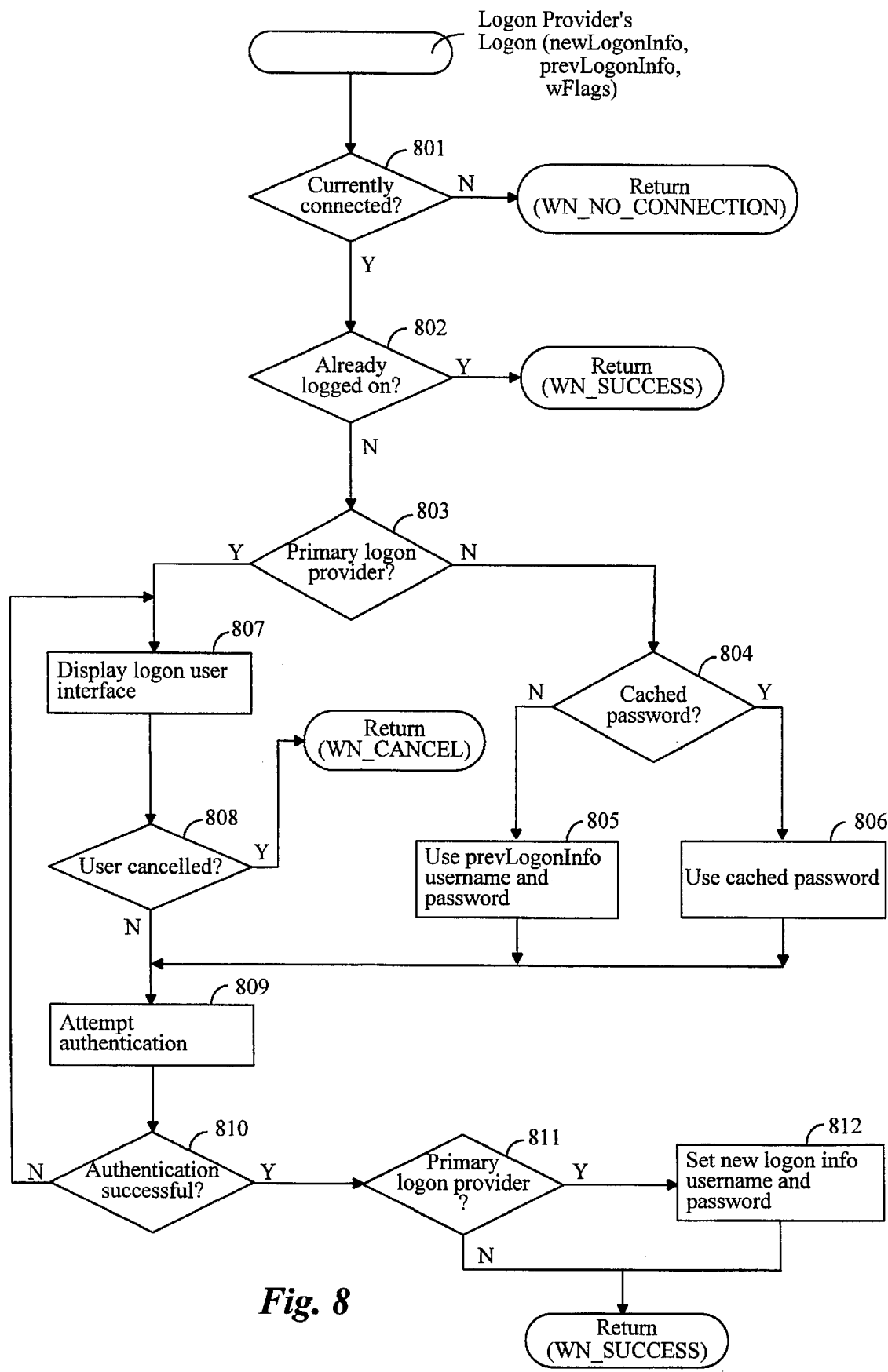
FIG. 8 is a flow diagram of an example logon routine implemented by a logon provider.

FIG. 8 is a flow diagram of an example logon routine implemented by a logon provider. This figure illustrates a preferred implementation of the logon routine defined in the Network Service Provider Interface ("SPI") shown in FIG. 6. Any logon provider that implements the logon routine defined in the SPI can be designated as a primary logon provider, as was discussed with reference to FIG. 1. Different behaviors are provided by the logon routine with respect to displaying a logon user interface based upon whether the logon routine is called as the primary logon provider's logon routine or whether it is called as a supplemental logon provider's logon routine. In summary, the logon routine determines whether it should display a logon user interface to collect identification information, displays the logon user interface when needed, authenticates the collected identification information, and returns the authenticated identification information to the MPR code logon sequence shown in FIG. 7.

Specifically, in step 801, the logon routine determines whether the logon provider is currently connected to its corresponding device (or pseudo-device) and the connection has not failed and, if so, continues in step 802, else returns with a status indicating that no connection is available (or the connection has otherwise failed). In step 802, the logon routine determines whether the user has already logged on and, if so, returns a successful status, else continues in step 803. In step 803, the logon routine determines whether it is being called as the primary logon provider's logon routine and, if so, continues in step 807, else continues in step 804. In step 804, when the logon routine is invoked as a supplemental logon provider routine, the logon routine determines whether a password has been cached for its services and, if so, continues in step 806, else continues in step 805. Passwords are cached, for example, when a network driver asks the user whether it should remember a previously entered password for future invocations to avoid prompting the user again. In step 806, if a password has been cached, then this cached password is used in step 809. Otherwise, if no password has been cached, the logon provider will use identification information (user name and password) supplied in an input parameter to the logon routine as shown in step 805. The logon routine then continues in step 809. If, in step 803, the logon routine instead determines that it has been invoked as the primary logon provider's logon routine, then in step 807 the logon routine displays its logon user interface. In step 808, the logon routine determines whether the user canceled out of this user interface and, if so, returns with a status of cancellation, else continues in step 809.

In step 809, the logon routine authenticates the identification information either collected from the logon code's user interface in step 807, from the identification information supplied in an input parameter in step 805, or from the password cache as described in step 806. The authentication procedure is specific to each logon provider and may be as simple as validating the collected information against a password file. The authentication procedure authorizes access to whatever services are provided by that particular logon provider. In step 810, the logon routine determines whether the authentication procedure was successful and, if so, continues in step 811, else returns to step 807 to display a logon user interface to collect additional identification information in order to reattempt the authentication procedure. The authentication procedure is reattempted until either the authentication is successful or until the user cancels out of the user interface. In step 811, the logon routine determines whether it is invoked as the primary logon provider's logon routine and, if so, continues in step 812, else returns with a successful status. In step 812, the routine sets an output parameter to indicate the collected and authenticated identification information and returns a successful status.

One security issue that surfaces with the embodiment discussed with reference to FIGS. 7 and 8 is that any code that is able to install itself as a logon provider will be passed the user's identification information by the MPR logon sequence. Thus, code could be installed to store the passed identification information and to use it for unauthorized purposes. One skilled in the art will recognize that there are different mechanisms available for preventing such unwanted behavior. In one embodiment, the operating system verifies that each logon provider is a legitimate (or known) logon provider. This verification of the logon providers can be done at load time, at configuration time, or at some other time such as right before identification information is passed. One such verification technique is to use digital signature techniques, such as those described in Schneier, B., *Applied Cryptography*, Wiley & Sons, Inc., N.Y., 1994. According to this embodiment, the logon providers are passed identification information only after the logon providers have been previously verified by the operating system.

The preferred embodiments discussed are also applicable to logon providers that are not network drivers. One skilled in the art will recognize that any code that supports a logon routine as described with reference to FIG. 8 can be configured as a logon provider. For example, if code is provided in a DLL that provides a secure front end to a database and supports the logon routine discussed with reference to FIG. 8, then the MPR logon sequence discussed with reference to FIGS. 6 and 7 can invoke the logon routine when the DLL code is designated as the primary logon provider. Also, the MPR logon sequence can invoke a non-network logon provider's logon routine as a supplemental logon provider in step 605 of FIG. 6 and steps 711–713 of FIG. 7. Thus, the user interface for logon to an entire computer system (whether connected or not to a network) can be replaced by providing logon provider code with a logon routine conforming to the SPI definition discussed with reference to FIG. 8.

One skilled in the art will also recognize that other embodiments for replacing the computer system logon user interface are possible. For example, in another network environment, the code to provide network services (the network driver code) can be separate from the code used to display a logon user interface and to authenticate the user for access to the computer system. Specifically, a separate code module, which is invoked whenever logon is performed, is provided to implement the initial (system) logon and authentication procedure for the computer system that is invoked during power up. In this embodiment, the user interface for system logon is replaced by linking in the desired logon user interface (e.g., at run time). For example, the code module with the desired logon user interface can be copied into or renamed as the logon and authentication module. According to this embodiment, the MPR code links in the appropriate logon user interface module to provide the initial user interface for collecting the identification information instead of invoking a network driver as the primary logon provider. Using this alternative embodiment, each network driver is independent of the user interface used to authenticate access to a network or to the computer system. Once access has been granted, the identification information can be passed on to the other network drivers as indicated in FIGS. 6 and 7.

As an example of this alternative embodiment, a logon user interface that provides card reader access to the computer system could replace the standard operating system logon dialog shown in FIG. 2. A third party developer could provide such a replacement interface by coding a separate DLL which is then linked appropriately into the MPR code. A card reader user interface may provide additional security by requiring an intended user to enter a personal identification number.

The preferred embodiment discussed with reference to FIGS. 6–8 can also be used to provide a local computer system access to a network during the local system logon process. This capability is useful, for example, when user profiles (information specific to a user) are stored on a server node on the network and the user profile information is needed to authenticate the user for access to the local computer system. Such an architecture might be useful to enable a network system administrator to control which users have access to which systems. According to this embodiment, once the MPR code has invoked (successfully) the primary logon provider's logon routine, the MPR code can then access files on the network accessible through the primary logon provider.

Although the present invention has been disclosed and described in terms of preferred embodiments, it is not intended that the invention be limited to such embodiments. Modifications within the spirit of the invention will be apparent to those skilled in the art. The scope of the present invention is defined by the claims which follow.

What is claimed is:

1. A method in a computer system network environment for authenticating access to computing services, the computer system network environment having a local computer system that can be connected to multiple heterogeneous networks, the local computer system having local authentication code to access local computer system services, the method comprising the computer-implemented steps of:

determining a primary logon driver, the primary logon driver for providing access to a first network and having a user interface with components for collecting identification information for the primary logon driver;

invoking the primary logon driver;

under control of the primary logon driver, invoking the user interface of the primary logon driver when needed;

in response to receiving identification information through the user interface components, authenticating the received identification information to allow access to the first network; and indicating the authenticated identification information to the local authentication code;

under control of the local authentication code, authenticating the indicated identification information to allow access to the local computer system services;

determining a supplemental logon driver for providing access to a second network;

invoking the determined supplemental logon driver; and under control of the invoked supplemental logon driver, authenticating previously provided identification information to allow access to the second network.

2. The method of claim 1 wherein the step of authenticating the indicated identification information to allow access to the local computer system services is performed without invoking another user interface.

3. The method of claim 1 wherein the step of, under control of the primary logon driver, invoking the user interface is only performed when the primary logon driver is actively connected to the first network.

4. The method of claim 1 wherein the step of, under control of the primary logon driver, invoking the user interface is performed when the primary logon driver establishes that it can access resources in order to perform the step of authenticating.

5. The method of claim 1 wherein the step of, under control of the invoked supplemental logon driver, authenticating previously provided identification information is performed using the identification information authenticated by the primary logon driver.

6. The method of claim 1 wherein the step of, under control of the invoked supplemental logon driver, authenticating previously provided identification information is performed using the identification information authenticated by the local authentication code.

7. The method of claim 1 wherein the step of, under control of the invoked supplemental logon driver, authenticating previously provided identification information is performed without invoking another user interface.

8. The method of claim 1 wherein the step of determining the primary logon driver is performed under the control of a user.

9. The method of claim 1 wherein the user interface of the primary logon driver is supplied by the primary logon driver.

10. A method in a computer system for authenticating access to local system services, the computer system having system authentication code to secure access to the local system services, the method comprising the computer-implemented steps of:

- selecting one of a plurality of logon providers as a primary logon provider, the primary logon provider for providing access to provider services and having a user interface with components for collecting identification information;
- invoking the user interface of the primary logon provider when needed;
- under control of the primary logon provider and in response to receiving identification information through the user interface components or using provided authentication information, authenticating the received or provided identification information to allow access to the provider services and indicating the received or provided information to the system authentication code; and
- under control of the system authentication code, authenticating the indicated received or provided identification information to allow access to the local system services.

11. The method of claim 10 wherein the user interface of the primary logon provider is supplied by the primary logon provider thereby enabling replacement of the user interface.

12. The method of claim 10 wherein the primary logon provider is a network driver and the step of authenticating the received or provided identification information to allow access to the provider services provides access to a network when the authentication is successful.

13. The method of claim 10 wherein the step of authenticating the indicated received or provided identification information to allow access to the local system services includes the substep of invoking a second user interface for receiving identification information that is different from the first user interface, when the step of authenticating the received or provided identification information to allow access to the provider services is not successful.

14. The method of claim 10 wherein the step of authenticating the received or provided identification information to allow access to the provider services is performed when the primary logon provider is successfully connected to a device, a pseudo-device, or a set of services.

15. The method of claim 10 wherein the step of determining the primary logon provider comprises the substeps of:

- displaying a list of logon providers; and
- designating one of the displayed logon providers as the primary logon provider.

16. The method of claim 15 wherein the step of designating one of the displayed logon providers is performed in response to a user selection of one of the logon providers from the displayed list.

17. A method in a computer system for authenticating access to a plurality of resources using a single user interface, the computer system having authentication code to access system services, the method comprising the computer-implemented steps of:

- determining a primary logon provider, the primary logon provider for providing access to provider services and having a user interface for identifying access information;
- invoking the user interface of the primary logon provider when appropriate;
- identifying access information, the access information being collected through the invoked user interface of the primary logon provider when appropriate;
- authenticating the identified access information to allow access to the provider services;
- authenticating the identified access information to allow access to the system services without invoking an additional user interface;
- determining a supplemental logon provider, the supplemental logon provider for providing access to supplemental provider services; and
- authenticating the identified access information to allow access to the supplemental provider services without invoking an additional user interface.

18. The method of claim 17 wherein the primary logon provider is a network driver and the step of authenticating the identified access information to allow access to the provider services provides access to a network when the authentication is successful.

19. The method of claim 18 wherein the supplemental logon provider is a network driver and the step of authenticating the identified access information to allow access to the supplemental provider services provides access to a second network when the authentication is successful.

20. The method of claim 19 wherein the second network is a different type of network abiding by a different communications protocol than the network accessible through the provider services of the primary logon provider.

21. The method of claim 17 wherein the supplemental logon provider is a network driver and the step of authenticating the identified access information to allow access to the supplemental provider services provides access to a second network when the authentication is successful.

22. A method in a computer system for authenticating access to the computer system, the computer system having a system defined user interface to identify access information and having authentication code to access system services, the method comprising the computer-implemented steps of:

- determining a primary logon provider, the primary logon provider for providing access to provider services and having a user interface for identifying access information;
- determining whether the primary logon provider is successfully connected to a device or pseudo-device for which the provider services are provided;
- when it is determined that the primary logon provider is successfully connected,
  - invoking the user interface of the primary logon provider;
  - identifying access information through the invoked user interface of the primary logon provider;
  - authenticating the identified access information to allow access to the provider services; and
  - authenticating the identified access information to allow access to the system services without invoking an additional user interface; and
- when it is determined that the primary logon provider is not successfully connected,
  - invoking the system defined user interface;
  - identifying access information through the invoked system defined user interface; and
  - authenticating the access information identified through the system defined user interface to allow access to the system services.

23. A method in a computer system for accessing system authentication information stored on a network, the computer system having local system logon code to enable access to local computer system services, the method comprising the computer-implemented steps of:

invoking a primary logon provider, the primary logon provider providing a user interface for collecting identification information and having code for accessing a network;

under control of the primary logon provider, invoking the user interface of the primary logon provider when needed;

identifying identification information, the identified information either received through the displayed user interface or provided without invoking the user interface of the primary logon provider;

authenticating the identified identification information for access to the network; and indicating the identified identification information to the local system logon code;

invoking the local system logon code; and under control of the local system logon code, using the indicated identification information to access the network;

retrieving the system authentication information stored on the network using the primary logon provider code; and authenticating the indicated identification information for access to the local computer system services using the system authentication information retrieved from the network.

24. A computer system for authenticating access to local system services comprising:

means for determining a primary logon driver, the primary logon driver for providing access to driver services and having a user interface for identifying access information;

driver means for invoking the user interface of the determined primary logon driver, identifying access information, authenticating the identified access information for access to the driver services, and sending the authenticated access information;

system means for authenticating the sent access information for access to the local system services, which operates in response to receiving the authenticated access information from the driver means and which operates without invoking another user interface; and logon means for invoking the primary logon driver determination means and for invoking the driver means.

25. The computer system of claim 24 wherein the driver means is a network driver that provides access to a network when the driver means successfully authenticates the identified access information.

26. The computer system of claim 24, the driver means performing the invoking of the user interface when the primary logon driver is successfully connected to a device or pseudo-device.

27. A computer system for authenticating access to system services comprising:

means for determining a primary logon driver, the primary logon driver for providing access to driver services and having a user interface for identifying access information;

driver means for, when the primary logon driver is successfully connected to a device or pseudo-device, invoking the user interface of the determined primary logon driver, identifying access information, authenticating the identified access information for access to the driver services, and sending the authenticated access information;

system means for authenticating the sent access information for access to the system services, which operates in response to receiving the authenticated access information from the driver means and which operates without invoking another user interface;

logon means for invoking the primary logon driver determination means and for invoking the driver means; and an alternate system means for authenticating access information for access to the system services, which is invoked by the logon means to operate when the primary logon driver is not successfully connected to a device or to a pseudo-device and which invokes a system user interface for identifying access information and authenticates the access information identified by the system user interface in order to provide access to the system services.

28. A local computer system comprising:

a input-output device;

a primary logon driver associated with a set of driver services that provide access to the input-output device that, in response to being invoked, invokes a user interface when needed to retrieve an identification name and password from a user, authenticates the retrieved identification name and password for access to the driver services, and returns the authentication results;

a router that, in response to being invoked, invokes the primary logon driver and uses the authentication results returned by the primary logon driver to authenticate the user for access to the local computer system; and a command sequence that causes the router to be invoked.

29. The computer system of claim 28 wherein the input-output device is a network and the primary logon driver is a network driver that provides access to the network, whereby the authentication results returned by the network driver are used to authenticate access to the local computer system.

30. The computer system of claim 28 wherein the input-output device is a storage device that stores a database and the primary logon driver is associated with a set of database services that provide access to the database, and wherein the access to the local computer system is to services that are not database services.

31. The computer system of claim 28 wherein the primary logon driver is an electronic mail server, and wherein the access to the local computer system is to services that are not electronic mail services.

32. The computer system of claim 28 wherein the router invokes a second user interface that is different than the first user interface if the authentication results returned by the primary logon driver are unsuccessful.

33. The computer system of claim 28 wherein the primary logon driver first determines whether the primary logon driver is successfully connected to the input-output device and, when it is determined that the driver is not successfully connected, returns authentication results indicating unsuccessful authentication, without invoking the user interface.

34. The computer system of claim 33 wherein the router invokes a local system user interface if the authentication results returned by the primary logon driver are unsuccessful.

35. The computer system of claim 28 wherein the router uses the returned authentication results without invoking an additional user interface to provide access to the local computer system.

36. A distributed computer-readable memory medium containing instructions for controlling a computer processor in a computer system network environment to authenticate access to computing services, the computer system network environment having a local computer system that can be connected to multiple heterogeneous networks, the local computer system having local authentication code to access local :.computer system services, by performing the steps of:

determining a primary logon driver, the primary logon driver for providing access to a first network and having a user interface with components for collecting identification information for the primary logon driver;

invoking the primary logon driver;

under control of the primary logon driver,
invoking the user interface of the primary logon driver when needed;
in response to receiving identification information through the user interface components, authenticating the received identification information to allow access to the first network; and
indicating the authenticated identification information to the local authentication code;

under control of the local authentication code, authenticating the indicated identification information to allow access to the local computer system services;

determining a supplemental logon driver for providing access to a second network;

invoking the determined supplemental logon driver; and under control of the invoked supplemental logon driver, authenticating previously provided identification information to allow access to the second network.

37. The distributed computer-readable memory medium of claim 36 wherein the step of authenticating the indicated identification information to allow access to the local computer system services is performed without invoking another user interface.

38. The distributed computer-readable memory medium of claim 36 wherein the step of, under control of the primary logon driver, invoking the user interface is only performed when the primary logon driver is actively connected to the first network.

39. The distributed computer-readable memory medium of claim 36 wherein the step of, under control of the primary logon driver, invoking the user interface is performed when the primary logon driver establishes that it can access resources in order to perform the step of authenticating.

40. The distributed computer-readable memory medium of claim 36 wherein the step of, under control of the invoked supplemental logon driver, authenticating previously provided identification information is performed using the identification information authenticated by the primary logon driver.

41. The distributed computer-readable memory medium of claim 36 wherein the step of, under control of the invoked supplemental logon driver, authenticating previously provided identification information is performed using the identification information authenticated by the local authentication code.

42. The distributed computer-readable memory medium of claim 36 wherein the step of, under control of the invoked supplemental logon driver, authenticating previously provided identification information is performed without invoking another user interface.

43. The distributed computer-readable memory medium of claim 36 wherein the step of determining the primary logon driver is performed under the control of a user.

44. A distributed computer-readable memory medium containing instructions for controlling a computer processor in a computer system to authenticate access to local system services, the computer system having system authentication code to secure access to the local system services, by performing the steps of:

selecting one of a plurality of logon providers as a primary logon provider, the primary logon provider for providing access to provider services and having a user interface with components for collecting identification information;

invoking the user interface of the primary logon provider when needed;

under control of the primary logon provider and in response to receiving identification information through the user interface components or using provided authentication information, authenticating the received or provided identification information to allow access to the provider services and indicating the received or provided information to the system authentication code; and under control of the system authentication code, authenticating the indicated received or provided identification information to allow access to the local system services.

45. The distributed computer-readable memory medium of claim 44 wherein the user interface of the primary logon provider is supplied by the primary logon provider thereby enabling replacement of the user interface.

46. The distributed computer-readable memory medium of claim 44 wherein the primary logon provider is a network driver and the step of authenticating the received or provided identification information to allow access to the provider services provides access to a network when the authentication is successful.

47. The distributed computer-readable memory medium of claim 44 wherein the step of authenticating the indicated received or provided identification information to allow access to the local system services includes the substep of invoking a second user interface for receiving identification information that is different from the first user interface, when the step of authenticating the received or provided identification information to allow access to the provider services is not successful.

48. The distributed computer-readable memory medium of claim 44 wherein the step of authenticating the received or provided identification information to allow access to the provider services is performed when the primary logon provider is successfully connected to a device, a pseudo-device, or a set of services.

49. The distributed computer-readable memory medium of claim 44 wherein the step of determining the primary logon provider comprises the substeps of:

displaying a list of logon providers; and designating one of the displayed logon providers as the primary logon provider.

50. The distributed computer-readable memory medium of claim 49 wherein the step of designating one of the displayed logon providers is performed in response to a user selection of one of the logon providers from the displayed list.

* * * * *